United States Patent Office 3,500,503
Patented Mar. 17, 1970

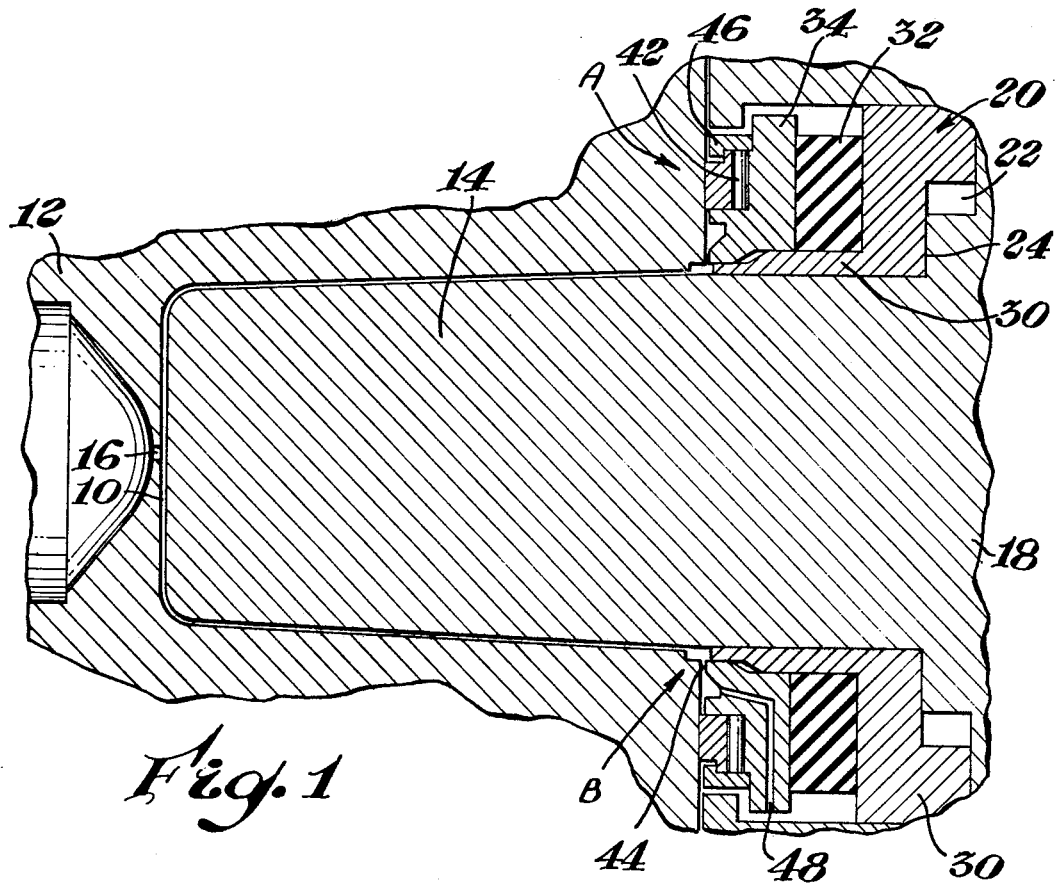
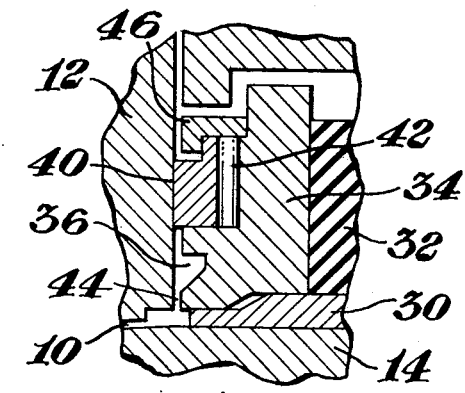
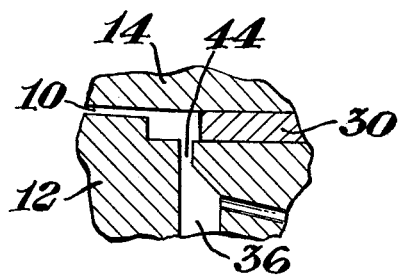

3,500,503
MECHANICAL SEAL FOR USE ON MOLDING APPARATUS
Kenneth J. Cleereman, Midland, and Edward R. Sederlund, Saginaw, Mich., assignors to The Dow Chemical Company, Midland, Mich., a corporation of Delaware
Continuation-in-part of application Ser. No. 580,697, Sept. 20, 1966. This application Dec. 28, 1967, Ser. No. 694,162
Int. Cl. B29f 1/03
U.S. Cl. 18—42                                   9 Claims

ABSTRACT OF THE DISCLOSURE

In plastic mold apparatus wherein at least one mold element rotates, a seal comprising a rotating element with an annular gap leading from the mold cavity, and a friction reducing needle bearing between said rotating element and the outer mold element to maintain proper gap width for extended periods, the annular gap effecting the seal.

---

This application is a continuation-in-part of United States patent application, Ser. No. 580,697 filed Sept. 20, 1966, now Patent No. 3,398,434.

This invention relates to an annular gap seal effected by mechanical elements of molding apparatus wherein at least one mold element is rotated or oscillated during the molding operation to impart orientation to the molecules of the plastic being molded.

In order to produce molded plastic articles of greater strength, it is desired to impart preferred orientation to the long chain molecules of a polymer. This can be accomplished by rotating, or oscillating, one surface of the mold cavity with respect to the other during the forming process, as described in U.S. Patent No. 3,307,726.

While the rotation of one mold element with respect to the other produces a superior molded article, complications arise in the sealing between the rotating and stationary mold elements. The relative motion will, in general, produce friction at the interface between the mold elements unless steps are taken to alleviate the friction. Such friction causes wear between the mold elements and a reduction in polymer viscosity in the seal area.

In ordinary injection molding processes, the molten plastic is introduced into the cavity at high pressures and speeds. Since all seals are static, in such a process, the mold is generally held shut by the use of a clamping force which is higher than the force exerted by the plastic during the injecting cycle. Elements such as knockout pins which move only when the plastic is solidified are no problem to seal. In such case, a precision fit with a minimum sliding tolerance will stop polymer flow and no flash is encountered.

An entirely different situation exists, however, when one of the mold elements is rotated or oscillated such as in the recent development, described in U.S. Patent No. 3,307,726, wherein orientation is imparted to the molecules. The normal minimum tolerances, which permit rotation or oscillation, causes flow of the plastic between the mold elements. This appears to be increased because of the reduction in viscosity of the polymer mentioned above.

Journal bearings are not generally satisfactory because the molten plastic flashes into the bearing seal. The bearing must then be cleaned out between each cycle. In a production operation, this would be intolerable.

In parent patent application, Ser. No. 580,697, a novel seal is disclosed. It comprises a narrow annular gap leading from the mold cavity to an annular reservoir. The gap is narrow and long enough to cause a pressure drop which prevents flashing, that is, passing of the resin through the gap. However, in the event any residuum developes, it can pass through the gap and be deposited in the annular reservoir where it may be stored, and needs only to be removed periodically.

A problem occurs during high speed long continued production however, because an unacceptable high rate of wear occurs between the mating interfaces of mold elements, thereby causing a variation in the gap width where tolerances are critical.

Accordingly, it is an object of the present invention to provide a further improved seal for molding plastic wherein rotation or oscillation of one of the mold elements is used.

Another object is to provide a seal of fairly simple construction.

Still another object is to provide seals of the above character which tend to eliminate flashing.

A further object is to provide seals, of the above character, which have unusually long life.

A still further object is to provide seals, of the above character, having means for preventing a deposit from occurring at the mold interfaces so that the need to clean the mold often is virtually eliminated.

Another object is to provide seals, of the above character, which need not be continuously lubricated.

Another object is to provide seals, of the above character, which are constructed in a fashion such that centering of a rotating mandrel is more easily accomplished and which, in addition, function as a stripper ring to remove the molded article from the mandrel.

Another object is to provide seals, of the above character, permitting greater interface pressure but with less wearing of surfaces during long continued use than heretofore possible.

Other objects of the invention will in part be obvious and will in part appear hereinafter.

An improved seal structure has now been devised which accomplishes the above objectives by relocating most of those parts which move relative to one another to a position in the mold apparatus removed from the molten plastic and supporting those parts under pressure that act to effect the seal with needle bearings to reduce wear. More specifically, the seal structure comprises, in its broadest sense, mechanical joint elements which are held together under pressure. The interface between these elements has a narrow annular gap leading from the mold cavity into an annular reservoir, which gap actually forms the seal. The gap is long and thin enough to cause a pressure drop which prevents resin material from flowing through it. The only contact between the moving and the stationary elements of the mold apparatus occurs through needle bearings, whereby wear is completely minimized and gap dimensions can be long maintained.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIGURE 1 is a cross-sectional view of part of an injection mold apparatus illustrating the seal of this invention;

FIGURE 2 is an enlarged cross-sectional view of Area A of FIGURE 1; and

FIGURE 3 is a greatly enlarged cross-sectional view of Area B of FIGURE 1.

Similar reference characters refer to similar parts throughout the several views of the drawing.

Referring now to the drawings, there is illustrated a preferred embodiment of an improved seal structure incorporated into an injection mold apparatus for making cups. With the exception of variations in the seal design described in detail below, the injection mold apparatus can be of the type generally shown by U.S. Patent No. 3,307,726 and, for this reason, only that portion thereof which is necessary to explain the invention hereof is illustrated. Also, while the description presumes that the mandrel 10 is rotated, it could as well be oscillated, or rotated and oscillated.

As is known, injection mold apparatus generally has a nozzle valve and an injection plunger, both of which individually reciprocate within an injection cylinder to supply a metered amount of fluid thermoplastic material to a mold cavity 10 defined by an outer mold element 12 and an inner mating mold element or mandrel 14.

The fluid thermoplastic is injected through orifice 16, into the mold cavity 10. Fluid plastic conveying means, such as an exturder, is generally provided to supply fluid plastic to the injection cylinder in a continuous fashion. Usually, in orientation molding for simplicity the outer mold element is stationary and the inner mold element is rotated or oscillated or rotated and oscillated. This may, however, be reversed, if desired.

Mandrel 10 comprises the forward end of a spindle 18 which can be rotated by any suitable means, such as by a constant torque motor (not shown). As best seen in FIGURE 1, an outer compressing element support-stripper ring 20 is mounted on spindle 18 in front of two steplike annular flanges 22 and 24 which project outwardly from spindle 18. Integral with ring 20 is a forward protruding cup stripper 30. It forms one surface of the rim forming portion of mold cavity 10. A compression ring 32 is located forward of ring 20 and concentric about stripper 30. As shown, compression ring 32 is a rubber compression ring but it may also be a Belleville spring, or a series of springs forward (to the left in FIGURE 1) of ring 20. Or as described in the parent application, Ser. No. 580,097, it may be hydraulic pressure provided appropriate seal rings are employed.

Forward of compression ring 32 is an inner bearing or pressure ring 34 which acts as a bearing race. The interior forward face of ring 34 contains an annular reservoir 36.

The width and depth of reservoir 36 can vary between wide limits and only need be of a size to collect therein any residuum deposit which may occur.

Reservoir 36 is terminated at its radial extremity by a concentric outer bearing or pressure ring 40 which acts as a bearing race. Its forward surface abuts against outer mold element 12 to maintain to proper width of sealing gap 44 hereinafter described in more detail. On the rearward side, pressure ring 40 bears against needle bearing 42, which is of annular shape.

Needle bearing retainer ring 46 is attached to ring 34 and is of substantially L-shaped cross-section to hold bearings 42 in place between rings 34 and 40.

A relatively small sealing gap 44 (see FIGURE 3) is provided between reservoir 36 and mold cavity 10. The gap is long and narrow enough to act as a pressure drop which prevents plastic from leaking between the mold elements. High pressures can be exerted from mold cavity 10 by compression ring 32 to maintain the proper gap width and, because of the needle bearing, only negligible wear will occur during long continued high speed operations.

As a specific illustration, it will be found that, in using a particular polystyrene resin, the gap 44 (FIGURE 3) accomplishes its purposes if its depth is within a range of about 0.0005 to about 0.002 of an inch and its width is approximately .030 of an inch.

If any flashing does occur, the residuum can be removed by simply occasionally blowing it out of the reservoir 36. It need not be wiped off.

Referring to the lower portion of the mold shown in FIGURE 1, an air vent 48 is preferably contained within support ring 34 to facilitate venting of air from the mold cavity during an injection mold operation, and to provide for removal of any residuum.

Because of the use of needle bearings, the need to have anti-friction bearing material for what would otherwise be a wearing surface of ring 40, where it contacts the outer mold element 12, is eliminated. Such surfaces need merely resist brinelling.

While certain representative embodiments and details have been shown for the purpose of illustrating the invention, it will be apparent to those skilled in the art that various changes and modifications can be made therein without departing from the spirit and scope of the invention.

What is claimed is:

1. In a molding apparatus having an outer mold element and an inner mating mold element which together define a mold cavity and at least one of which is moving during the molding cycle, a seal comprising a compression element about said inner mold element, an inner bearing ring concentric about and rotatable with said inner mold element and spacedly adjacent said outer mold element when said mold apparatus is closed, said bearing ring providing a narrow annular sealing gap between said ring and said outer mold element, an outer bearing ring in contact with said outer mold and generally non-rotatable with respect thereto, and a bearing interposed between said inner and outer bearing rings; said gap leading from said mold cavity and of a dimension to prevent injected plastic within said mold cavity from flowing therethrough.

2. The seal of claim 1 wherein said gap leads to a relatively deep annular reservoir for containing flash residuum.

3. The seal of claim 2 having in addition, a source of air whereby said annular reservoir may be blown clean by said source of air.

4. The seal of claim 1 wherein said compression element comprises rubberlike compression ring.

5. The seal of claim 1 wherein said gap has a depth within a range of approximately 0.0005 to approximately 0.002 of an inch.

6. The seal of claim 2 wherein said gap further has a width which is approximately $\frac{1}{32}$ of an inch.

7. The seal of claim 1 wherein said apparatus includes a stripper ring located about said compression element for stripping the molded article from said inner mold element.

8. The seal of claim 1 wherein said bearing is comprised of anti-friction material.

9. The seal of claim 8 wherein said bearing is a needle bearing.

References Cited

UNITED STATES PATENTS 3,371,387   3/1968   Cleereman et al.
3,389,434   6/1968   Cleereman et al.

J. HOWARD FLINT, Jr., Primary Examiner

U.S. Cl. X.R.

18—5; 277—96